US 12,122,968 B2

(12) United States Patent
Urakata et al.

(10) Patent No.: US 12,122,968 B2
(45) Date of Patent: Oct. 22, 2024

(54) NOZZLE WITH FILTER, GASIFICATION COMBINED CYCLE POWER GENERATOR, AND METHOD FOR DISASSEMBLING FILTER FROM NOZZLE WITH FILTER

(71) Applicant: MITSUBISHI HITACHI POWER SYSTEMS, LTD., Yokohama (JP)

(72) Inventors: Yuichiro Urakata, Kanagawa (JP); Koji Nishimura, Kanagawa (JP); Jun Kasai, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 886 days.

(21) Appl. No.: 16/476,632

(22) PCT Filed: Feb. 9, 2018

(86) PCT No.: PCT/JP2018/004742
§ 371 (c)(1),
(2) Date: Jul. 9, 2019

(87) PCT Pub. No.: WO2018/151059
PCT Pub. Date: Aug. 23, 2018

(65) Prior Publication Data
US 2021/0139798 A1    May 13, 2021

(30) Foreign Application Priority Data
Feb. 17, 2017 (JP) .................. 2017-028088

(51) Int. Cl.
*C10J 3/50*       (2006.01)
*B05B 1/02*       (2006.01)
*F16J 15/10*      (2006.01)

(52) U.S. Cl.
CPC .................. *C10J 3/50* (2013.01); *B05B 1/02* (2013.01); *F16J 15/10* (2013.01)

(58) Field of Classification Search
CPC ................. C10J 3/50; B05B 1/02; F16J 15/10
(Continued)

(56) References Cited

U.S. PATENT DOCUMENTS 5,242,119 A * 9/1993 Jariyasunant ............. E03C 1/08
                                                   239/590.5
5,545,242 A   8/1996 Whitlock et al.
(Continued)

FOREIGN PATENT DOCUMENTS

CN    202570475 U    12/2012
FR      2435288 A2    4/1980
(Continued)

OTHER PUBLICATIONS

International Search Report dated May 1, 2018, issued in counterpart application No. PCT/JP2018/004742, w/English translation (3 pages).
(Continued)

*Primary Examiner* — Christopher S Kim
(74) *Attorney, Agent, or Firm* — WHDA, LLP

(57) ABSTRACT

A pressurizing nozzle includes a nozzle body; a filter that is provided to be perpendicular to the central axis direction of the nozzle body so as to cover the internal cross section of the nozzle body at the leading end portion on one end of the nozzle body and that is made of sintered metal having a prescribed thickness in the central axis direction; a retainer having an annular shape that is mounted to the leading end portion of the nozzle body so as to be disassemble and that fixes the outer circumferential portion of the filter via a pair of sealing parts; and a sealing portion that is disposed along the outer circumferential end face of the filter and that seals a fluid from flowing from the outer circumferential face toward the outside in the radial direction through the filter.

8 Claims, 8 Drawing Sheets

(58) Field of Classification Search
USPC .............................................. 239/590–590.5
See application file for complete search history.

(56) References Cited

U.S. PATENT DOCUMENTS

2015/0299591 A1    10/2015  Yamamoto
2019/0031430 A1     1/2019  Urakata et al.

FOREIGN PATENT DOCUMENTS

| GB | 1 314 290 A   | 4/1973 |
|----|---------------|--------|
| JP | 63-191788 A   | 8/1988 |
| JP | 8-52311 A     | 2/1996 |
| JP | 2002-039394 A | 2/2002 |
| JP | 2002-102619 A | 4/2002 |
| JP | 2004-35235 A  | 2/2004 |
| JP | 4070325 B2    | 4/2008 |
| JP | 4070363 B2    | 4/2008 |
| JP | 2013-104475 A | 5/2013 |
| JP | 5868839 B2    | 2/2016 |
| JP | 2017-141073 A | 8/2017 |

OTHER PUBLICATIONS

Office Action dated Jul. 17, 2020, issued in counterpart CN Application No. 201880009234.9, with English translation (16 pages).

\* cited by examiner

NOZZLE WITH FILTER, GASIFICATION COMBINED CYCLE POWER GENERATOR, AND METHOD FOR DISASSEMBLING FILTER FROM NOZZLE WITH FILTER

TECHNICAL FIELD

The present invention relates to a nozzle with a filter, a gasification combined cycle power generator, and a method for disassembling a filter from a nozzle with filter.

BACKGROUND ART

For example, a carbonaceous fuel gasification unit (coal gasification unit) is known as a gasification unit that feeds carbonaceous feedstock such as coal to a gasifier and partially combusts and gasifies the carbonaceous feedstock to generate combustible gas.

In the coal integrated coal gasification combined cycle (IGCC) power plant (hereinafter referred to as "IGCC" power plant), raw syngas generated at the gasifier unit using the carbonaceous feedstock such as coal, is purified at a gas purifying unit into fuel gas, and the fuel gas is fed to a gas turbine installation to generate electrical power.

The gasifier unit includes a pulverized fuel supply hopper (powder supply hopper) for feeding pulverized fuel (powder) such as pulverized coal to a gasifier. When coal is used as carbonaceous feedstock, gas such as nitrogen gas is sent to the pulverized fuel supply hopper from outside, and the pressure of the pulverized fuel supply hopper increases to a pressure value equal to or larger than that in the gasifier. The pulverized fuel supply hopper pressurized to a predetermined pressure feeds the pulverized coal stored in the pulverized fuel supply hopper to the gasifier by the pressure difference of the gasifier (refer to Patent Literature 1).

The pulverized fuel supply hopper includes a pressurizing nozzle for jetting gas such as nitrogen gas, supplied from a buffer tank into the pulverized fuel supply hopper. The leading end of the pressurizing nozzle is provided with a filter for preventing backflow of the pulverized coal into the nitrogen system.

Furthermore, the gasifier unit includes a char recovery unit that collects the char included in raw syngas generated in the gasifier unit. The char recovery unit includes a dust collecting unit and a feed hopper. In such a case, the dust collecting unit includes cyclones and porous filters and can separate the char from the raw syngas generated in the gasifier unit. The feed hopper collects the char separated from the raw syngas at the dust collecting unit. The char stored in the feed hopper is returned to the gasifier unit through a char return line, for recycling. Furthermore, a char bin may be disposed between the dust collecting unit and the feed hopper, and multiple feed hoppers may be connected to this char bin.

Such a char bin and a feed hopper of the char recovery unit are provided with filters to prevent backflow of the char to the nitrogen system side.

For example, Patent Literature 2 and 3 disclose filters used in such a gasifier unit described above, that are made from sintered metal.

CITATION LIST

Patent Literature

Patent Literature 1: JP No. 4070325 B
Patent Literature 2: JP No. 4070363 B
Patent Literature 3: JP No. 5868839 B

SUMMARY OF INVENTION

Technical Problem

Some filters used in gasifier units as described above are made of sintered metal stronger than mesh. Such filters made of sintered metal, however, may be subjected to wear and breakage due to pulverized coal or char. Thus, it is desirable to install a filter to the pressurizing nozzle in a detachable manner for maintenance such as replacement.

A configuration of a filter installed in a detachable manner includes, for example, a filter 100 made of sintered metal disposed between an end portion 101a of a nozzle 101 and a retainer plate 102, as illustrated in FIG. 7. In such a configuration, the retainer plate 102 is fastened to the end portion 101a of the nozzle 101 with bolts 103, such that the retainer plate 102 is detachable from the nozzle 101. In such a configuration, annular gaskets 104 are disposed on both faces of the outer circumferential portion of the filter 100, to maintain the air-tightness between the filter 100 and a step-like portion 101b formed on the end portion 101a of the nozzle 101 and the retainer plate 102.

However, for example, for a case where the gas flowing through the nozzle 101 has a high temperature, the gasket 104 may be made of mild steel. In such a case, if temperature rises due to the high-temperature gas flowing through the nozzle 101, a difference occurs between the thermal elongation of the gaskets 104 and the thermal elongation of the nozzle 101, the retainer plate 102, and the bolts 103. This difference may cause a gap S to form between the end portion 101a of the nozzle 101 and the retainer plate 102. Consequently, the gas flowing through the nozzle 101 leaks to the outside from the outer circumferential end face 100s of the filter 100 through the gap S without flowing the filter 100. If the gas flow leaks to the outside through the gap S, the pulverized coal or char located around the nozzle 101 is caught in the flow of leaked gas, whereby wear of the components around the filter 100 may be caused.

Furthermore, another configuration of installing the filter 100 in a detachable manner includes, for example, interposing a filter 100 made of sintered metal between an end portion 111a of a nozzle 111 and a retainer sleeve 112 fit to the end portion 111a, as illustrated in FIG. 8. The retainer sleeve 112 integrally includes a cylindrical portion 112a positioned on the outer circumferential side of the nozzle 111 and a flange portion 112b formed on one end of the cylindrical portion 112a and protruding toward the inner circumferential central axis C side. In the inner circumferential central axis C side of the cylindrical portion 112a, a female thread portion 112n that screws with a male thread portion 111n formed on the outer circumferential face of the nozzle 111 is provided. This configuration enables the retainer sleeve 112 to detach from the end portion 111a of the nozzle 111. In such a configuration, annular gaskets 104 are disposed on both faces of the outer circumferential portion of the filter 100, to maintain the air-tightness among the filter 100, the end portion 111a of the nozzle 111, and the flange portion 112b of the retainer sleeve 112. With such a structure, the gas flow does not readily leak from the gap S between the end portion 101a and the retainer plate 102, unlike the above-mentioned structure.

However, with the configuration illustrated in FIG. 8, the sealing capability of the gaskets 104 on both faces of the filter 100 may change depending on how hard the retainer sleeve 112 tightens the filter 100. Thus, there is a problem in that when the retainer sleeve 112 is tightened after maintenance, the gaskets 104 need to be checked for leaking, and, moreover, with a large number of nozzles 111 being used, labor required for maintenance increases.

An object of the present invention, which has been conceived in light of such circumstances, is to assuredly prevent leakage of gas outwards in the radial direction of a filter and provide a nozzle with a filter, a gasification combined cycle power generator, and a method for disassembling a filter from a nozzle with a filter.

Solution to Problem

To solve the above-described issues, a nozzle with a filter, a gasification combined cycle power generator, and a method for disassembling a filter from the nozzle with a filter according to the present invention employ the following solutions.

A nozzle with a filter according to an aspect of the present invention includes: a nozzle body having a cylindrical shape, the nozzle body in which a fluid flows; a filter including a porous body, the filter disposed in such a manner to cover an inner cross-sectional face of the nozzle body at a leading end portion on a first end portion side of the nozzle body; a retainer having an annular shape, the retainer attached to the leading end portion of the nozzle body in a detachable manner, the retainer configured to fix an outer circumferential portion of the filter via a pair of sealing parts; and a sealing portion disposed along an outer circumferential end face of the filter. In nozzle with a filter according to an aspect of the present invention, a flange member is disposed on a base end portion of the nozzle body on a second end portion side, the flange member configured to support the nozzle body and the leading end portion in an airtight manner.

With the nozzle with a filter according to an aspect of the present invention, the sealing portion can seal off and prevent a fluid from flowing outwards in the radial direction from the outer circumferential end face of the filter through the filter. Thus, the pulverized coal is prevented from being caught in the flow of gas and causing wear of components around the filter. In this way, solid bodies can be prevented from being caught in the flow of an ejected fluid flowing outwards in the radial direction of the filter and causing wear and damage due to friction with the components around the filter.

Furthermore, the filter can be readily disassembled from the leading end portion of the nozzle body by disassembling the retainer provided on the leading end portion of the nozzle body. In other words, since the pipe connected to the base end portion side of the nozzle body for feeding the fluid to the interior of the nozzle body does not have to be disassembled from the base end portion of the nozzle body, leakage does not have to be checked at the adhered portion between the base end portion of the nozzle body and the pipe. In this way, the filter can be detached only on the leading end portion side of the nozzle body. Thus, maintenance of the filter can be readily performed, and the operation time can be reduced.

In the above-described nozzle with the filter, the retainer having an annular shape is attached to the leading end portion of the nozzle body in a detachable manner, the retainer is configured to fix the outer circumferential portion of the filter by sandwiching between the retainer and the leading end portion of the nozzle body; the pair of sealing parts are each disposed between the leading end portion of the nozzle body and the outer circumferential portion of the filter, and between the retainer and the outer circumferential portion of the filter; and the sealing portion is disposed between outer circumferential end portions of the pair of sealing parts along the outer circumferential end face of the filter.

With such a nozzle with a filter, the pair of sealing parts and the sealing portion surround the outer circumferential portion of the filter in a cross-sectional U-shape. Thus, the fluid can be more securely sealed and prevented from flowing outwards in the radial direction.

In the above-described nozzle with the filter, it is desirable that the sealing portion is a ring member made of metal, the ring member having a thickness in the central axis direction equal to or larger than the thickness of the filter.

With such a nozzle with a filter, since a metal ring member having a thickness in the central axis direction that is larger than or equal to the thickness of the filter as the sealing portion is disposed along the outer circumferential end face of the filter member between the outer circumferential portions of the pair of sealing parts, the adhesiveness between the pair of sealing parts can be increased, and the fluid can be assuredly sealed off and prevented from flowing out from the outer circumferential end face of the filter outwards in the radial direction through the filter.

Furthermore, since the ring member, for example, has a thickness in the central axis direction of the nozzle body equal to or larger than the thickness of the filter, at least the outer circumferential portions of the pair of sealing parts are sandwiched between the leading end portion of the nozzle body and the ring member disposed outwards in the radial direction of the outer circumferential portion of the filter and between the retainer and the ring member disposed outwards in the radial direction of the outer circumferential portion of the filter. In this way, since at least the outer circumferential portion of the contact face of the sealing part on the filter side is formed by the ring member, the contact face can be gas-tight and smooth in comparison to when the contact face is formed of only the filter. Thus, the sealing properties of the sealing parts are assuredly established.

In the above-described nozzle with a filter, it is more desirable that the filter includes sintered metal, and the ring member is welded to one of surfaces of the filter in the central axis direction along the outer circumferential end face.

With such a nozzle with a filter, by welding the ring member at one end surface along the outer circumferential end face of the filter by applying heat as little as possible, the filter and the ring member can be attached and detached integrally when attaching or detaching the filter. Thus, operability is enhanced. Furthermore, the ring member can be prevented from being displaced relative to the filter.

Furthermore, by welding only one of the faces of the filter in the central axis direction, the heat input resulting from welding by the filter 82 can be reduced to reduce deformation and damage.

In the above-described nozzle with a filter, it is more desirable that a welded portion between the filter and the ring member is disposed more outwards in the radial direction than an inner circumferential end face of the retainer.

With such a nozzle with a filter, the welded portion between the outer circumferential portion of the filter and the ring member is disposed more outwards in the radial direction than the inner circumferential end face of the retainer. When pressure is applied to the filter surface due to the temperature or pressure of the fluid passing through the interior of the nozzle body and the filter deforms, the fixed end of the deformation is the portion disposed between the inner circumferential end face of the retainer and the nozzle body and the free end of the deformation is the central side of the nozzle body. Thus, the welded portion W between the outer circumferential end face of the filter and the ring member serves as a fixed end of bending stress generated between the retainer and the filter when pressure is applied to the filter surface, and stress is generated. When the welded portion serving as the fixed end matches the inner circumferential end face of the retainer, the welded portion is also subjected to a shear force, which may cause a large amount of stress leading to breakage. By contrast, according to the present invention, since the welded portion between the outer circumferential end face of the filter and the ring member is disposed more outwards in the radial direction than the fixed end or the portion sandwiched between the inner circumferential end face of the retainer and the nozzle body, the generation of a shear force on the welded portion can be reduced, and the effect of stress due to deformation of the filter on the welded portion can be reduced. Thus, by reducing the stress applied to the filter, separation and/or damage to the welded portion can be reduced, and durability can be enhanced.

With the above-described nozzle with a filter, it is more desirable that the sealing portion is made of the same material as the pair of sealing parts and be integrated with the pair of sealing parts in a U-shape cross-section.

With such a nozzle with a filter, since the pair of sealing parts and the sealing portion surround the outer circumferential portion of the filter in a cross-sectional U-shape, the fluid can be assuredly sealed off and prevented from flowing outwards in the radial direction from the outer circumferential end face of the filter through the filter. In this way, solid bodies can be prevented from being caught in the flow of an ejected fluid flowing outwards in the radial direction of the filter and causing wear and damage due to friction with the components around the filter.

Furthermore, since the pair of sealing parts and the sealing portion are integrated into a single unit, the pair of sealing parts and the sealing portion can be disassembled integrally by disassembling the retainer installed on the leading end portion of the nozzle body. Thus, operability is enhanced. Furthermore, the sealing portion can be prevented from being displaced relative to the filter.

In the above-described nozzle with a filter, it is more desirable that a groove fitting with the sealing parts is formed on at least one of the leading end portion of the nozzle body and the retainer.

With such a nozzle with a filter, since a groove to be fit into a sealing part is formed on at least one of these, the sealing parts can be readily positioned and held in place during assembly of the sealing parts. Furthermore, it is even more desirable to form grooves to be fit into sealing parts on both of these including the retainer. This assuredly enhances operability and the sealing capability.

Furthermore, by fitting the sealing parts in the grooves, the boundary surfaces between the leading end portion of the nozzle body and the sealing parts, and between the retainer and the sealing parts form a labyrinth-like structure, whereby the sealing capability can be enhanced even when the adhesiveness with the sealing parts is reduced.

A gasification combined cycle power generator according to an aspect of the present invention includes the above-described nozzle with a filter.

With a gasification combined cycle power generator according the present invention, the sealing portion provided on the nozzle with a filter can seal off and prevent a fluid from flowing outwards in the radial direction from the outer circumferential end face of the filter through the filter. In this way, solid bodies such as pulverized coal and char can be prevented from being caught in the flow of ejected fluid flowing outwards in the radial direction of the filter and causing wear and damage due to friction between the solid bodies and the components around the filter.

Furthermore, the filter can be readily disassembled from the leading end portion of the nozzle body by disassembling the retainer provided on the leading end portion of the nozzle body. This enhances operability when conducting maintenance.

A method for disassembling a filter from a nozzle with a filter according to an aspect of the present invention, the nozzle with a filter including: a nozzle body having a cylindrical shape, the nozzle body in which a fluid flows; a filter including a porous body, the filter disposed in such a manner to cover an inner cross-sectional face of the nozzle body at a leading end portion on a first end portion side of the nozzle body; a retainer having an annular shape, the retainer attached to the leading end portion of the nozzle body in a detachable manner, the retainer configured to fix an outer circumferential portion of the filter via a pair of sealing parts; and a sealing portion disposed along an outer circumferential end face of the filter, the method for disassembling a filter includes: disassembling the retainer from the leading end portion of the nozzle body; and disassembling the filter, the pair of sealing parts, and the sealing portion from the leading end portion of the nozzle body.

Through a method for disassembling a filter from a nozzle with a filter according to an aspect of the present invention, a filter, a sealing part, and a sealing portion can be disassembled by disassembling a retainer from a leading end portion of a nozzle body. In other words, since the pipe or the like connected to the base end portion side of the nozzle body for feeding the fluid to the interior of the nozzle body does not have to be disassembled from the base end portion of the nozzle body, the filter can be attached or detached at only the leading end portion side of the nozzle. Thus, maintenance of the filter can be readily performed.

Advantageous Effect of Invention

A nozzle with a filter, a gasification combined cycle power generator, and a method for disassembling the filter from the nozzle with a filter according to the present invention can assuredly prevent leakage of gas outwards in the radial direction of the filter and allows easy maintenance of the filter.

DESCRIPTION OF EMBODIMENTS

Embodiments of the present invention will now be described with reference to the drawings.

An integrated coal gasification combined cycle power plant which is an embodiment of the integrated gasification combined cycle power plant according to the present invention will now be described.

Figure 1:
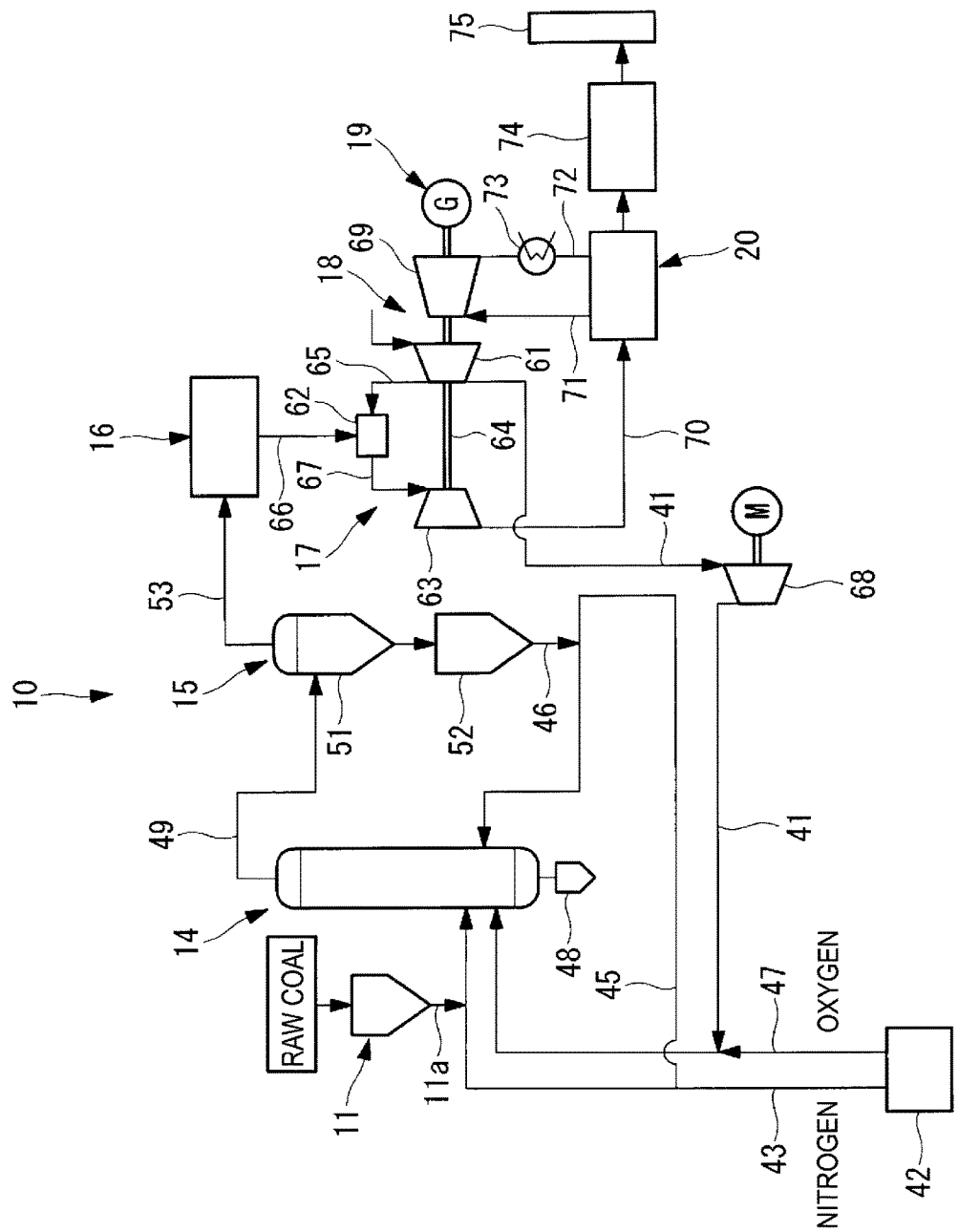
FIG. 1 is a schematic configuration diagram illustrating an IGCC power plant including a nozzle with a filter according to an embodiment of the present invention.

As illustrated in FIG. 1, in an integrated coal gasification combined cycle (IGCC) power plant 10, air is used as an oxygen containing gas and an air-combustion system is adopted in which combustible gas (raw syngas) is generated from fuel in a gasifier unit 14. In the IGCC power plant (gasification combined cycle power generator) 10, the raw syngas generated at the gasifier unit 14 is purified at a gas purifying unit 16 into fuel gas, and the fuel gas is fed to a gas turbine 17 to generate electrical power. Specifically, the IGCC power plant 10 according to the present embodiment is an air-combustion (air-blown) type power plant. Examples of the fuel fed to the gasifier unit 14 include carbonaceous feedstock such as coal.

The IGCC power plant 10 includes a coal feeding unit 11, a gasifier unit 14, a char collecting unit 15, a gas purifying unit 16, a gas turbine 17, a steam turbine 18, a generator 19, and a heat recovery stream generator (HRSG) 20.

The coal feeding unit 11 receives coal which is carbonaceous feedstock as raw coal, and pulverizes the received coal with a coal mill (not shown), to produce minute particles of pulverized coal. The pulverized coal produced at the coal feeding unit 11 is pressurized at an outlet of the coal line 11a by nitrogen gas serving as a conveyor inert gas from an air separating unit 42 described below and is fed to the gasifier unit 14. An inert gas has an oxygen content of approximately 5 volume percent or less. Typical examples of inert gas include nitrogen gas, carbon dioxide gas, and argon gas. The oxygen content is not always limited to approximately 5 volume % or less.

The gasifier unit 14 receives the pulverized coal produced at the coal feeding unit 11 and the char (unreacted material and ash of coal) collected by the char collecting 15 for reuse.

Furthermore, the gasifier unit 14 is connected to a compressed-air feed line 41 leading from the gas turbine 17 (compressor 61). Thus, a portion of the air compressed at the gas turbine 17 can be fed to the gasifier unit 14 after the pressure of the compressed air is increased to a predetermined pressure at a booster 68. The air separating unit 42 separates nitrogen and oxygen from the air in the atmosphere. The air separating unit 42 is connected to the gasifier unit 14 through a first nitrogen feed line 43. Then, the first nitrogen feed line 43 is connected to a coal line 11a leading from the coal feeding unit 11. Furthermore, a second nitrogen feed line 45 branching from the first nitrogen feed line 43 is also connected to the gasifier unit 14. The second nitrogen feed line 45 is connected to a char return line 46 leading from the char collecting unit 15. Moreover, the air separating unit 42 is connected to the compressed-air feed line 41 through an oxygen feed line 47. Then, the nitrogen separated at the air separating unit 42 serves as a gas for conveying coal and char by flowing through the first nitrogen feed line 43 and the second nitrogen feed line 45.

Furthermore, the oxygen separated at the air separating unit 42 serves as an oxygen containing gas at the gasifier unit 14 by flowing through the oxygen feed line 47 and the compressed-air feed line 41.

The gasifier unit 14 includes, for example, an air-blown two-stage entrained bed gasifier. The gasifier unit 14 partially combusts coal (pulverized coal) and the char fed to the interior of gasifier unit 14 with oxygen containing gas (air, oxygen) to gasify them into raw syngas. Note that the gasifier unit 14 includes a foreign-material removing unit 48 that removes foreign material (slag) mixed with the pulverized coal. The gasifier unit 14 is connected to a gas generation line 49 feeding the raw syngas to the char collecting unit 15, to discharge the raw syngas containing char. In such a case, the gas generation line 49 may be provided with a syngas cooler (gas cooler), to cool the syngas to a predetermined temperature before the syngas is fed to the char collecting unit 15.

The char recovery unit 15 includes a dust collecting unit 51 and a feed hopper 52. The dust collecting unit 51 includes one or more cyclones and porous filters and can separate the char from the raw syngas generated in the gasifier unit 14. The raw syngas separated from the char is sent to the gas purifying unit 16 through a gas discharge line 53. The feed hopper 52 stores the char separated from the raw syngas at the dust collecting unit 51. Note that a bin may be disposed between the dust collecting unit 51 and the feed hopper 52, and multiple feed hoppers 52 may be connected to this bin. Then, the char return line 46 leading from the feed hopper 52 is connected to the second nitrogen feed line 45.

The gas purifying unit 16 purifies the gas by removing impurities such as sulfur compounds and nitrogen compounds from the raw syngas separated from the char at the char collecting unit 15. Then, the gas purifying unit 16 purifies the raw syngas to produce fuel gas and feeds the fuel gas to the gas turbine 17. Note that the raw syngas separated from the char still has a sulfur content (such as H2S). Thus, the gas purifying unit 16 removes and collects the sulfur content with an amine absorbent or the like for efficient use.

The gas turbine 17 includes a compressor 61, a combustor 62, and a turbine 63. The compressor 61 and the turbine 63 are linked by a rotating shaft 64. The combustor 62 is connected to the compressed-air feed line 65 leading from the compressor 61, a fuel-gas feed line 66 leading from the gas purifying unit 16, and a combustion-gas feed line 67 leading to the turbine 63. Furthermore, the gas turbine 17 is provided with the compress-air feed line 41 leading from the compressor 61 to the gasifier unit 14. The booster 68 is disposed at an intermediate position on the compressed-air feed line 41. Thus, the combustor 62 produces combustion gas by mixing a portion of the compressed air fed from the compressor 61 with at least a portion of the fuel gas fed from the gas purifying unit 16 and combusting the mixture, and feeds the resulting combustion gas to the turbine 63. Then, the turbine 63 rotationally drives the rotating shaft 64 with the fed combustion gas, to rotationally drive the generator 19.

The steam turbine 18 includes a turbine 69 linked to the rotating shaft 64 of the gas turbine 17. The generator 19 is linked to the base end of the rotating shaft 64. The heat recovery stream generator 20 is connected to a gas discharge line 70 leading from the gas turbine 17 (turbine 63), to exchange heat between the feed water and the exhaust gas from the turbine 63 for steam generation. Then, the heat recovery stream generator 20 includes a steam feed line 71 and a steam collecting line 72, each connected to both the steam turbine 18 and the turbine 69. The steam collecting line 72 is connected to a condenser 73. Furthermore, the steam generated at the heat recovery stream generator 20 may include steam generated by heat exchange with the raw syngas at the syngas cooler of the gasifier unit 14. Thus, the steam turbine 18 rotationally drives the turbine 69 with the steam fed from the heat recovery stream generator 20, thereby rotating the rotating shaft 64 to rotationally drive the generator 19.

Then, a gas emission filtering unit 74 is disposed between the outlet of the heat recovery stream generator 20 and the chimney 75.

The operation of the IGCC power plant 10 according to the present embodiment will now be described.

In the IGCC power plant 10 according to the present embodiment, the raw coal (coal) fed to the coal feeding unit 11 is ground into fine particles at the coal feeding unit 11 to produce pulverized coal. The pulverized coal produced in the coal feeding unit 11 is fed to the gasifier unit 14 together with nitrogen fed from the air separating unit 42 through the first nitrogen feed line 43. The char collected by the char collecting unit 15 described below is fed to the gasifier unit 14 together with nitrogen fed from the air separating unit 42 through the second nitrogen feed line 45. The compressed air extracted by the gas turbine 17 described below is boosted to a higher pressure at the booster 68 and fed to the gasifier unit 14 through the compressed-air feed line 41 together with the oxygen fed from the air separating unit 42.

At the gasifier unit 14, the pulverized coal and the char are combusted by the compressed air (oxygen) and gasified to generate raw syngas. The raw syngas is discharged from the gasifier unit 14 through the gas generation line 49 and sent to the char collecting unit 15.

At the char collecting unit 15, the raw syngas is fed to the dust collecting unit 51 to separate the micronized char in the raw syngas. The raw syngas separated from the char is sent to the gas purifying unit 16 through the gas discharge line 53. In contrast, the micronized char separated from the raw syngas is accumulated in the feed hopper 52 and returned to the gasifier unit 14 through the char return line 46, for recycling.

The gas purifying unit 16 purifies the gas by removing impurities such as sulfur compounds and nitrogen compounds from the raw syngas separated from the char at the char collecting unit 15, to produce fuel gas. The compressor 61 generates compressed air and feeds the compressed air to the combustor 62. The combustor 62 generates combustion gas by mixing the compressed air fed from the compressor 61 with the fuel gas fed from the gas purifying unit 16 and combusting the mixture. By rotationally driving the turbine 63 with the combustion gas, the compressor 61 and the generator 19 are rotationally driven via the rotating shaft 64. In this way, the gas turbine 17 can generate electrical power.

The heat recovery stream generator 20 then generates steam by exchanging heat between the exhaust gas discharged from the turbine 63 of the gas turbine 17 and the feed water and feeds the generated steam to the steam turbine 18. Electrical power can be generated at the steam turbine 18 by rotationally driving the turbine 69 with the steam fed from the heat recovery stream generator 20 and thereby rotationally driving the generator 19 via the rotating shaft 64.

Besides the gas turbine 17 and the steam turbine 18 rotationally driving a single generator 19 via a single axis, the gas turbine 17 and the steam turbine 18 may rotationally drive multiple generators via multiple axes.

Then, the gas emission filtering unit 74 removes harmful substances in the exhaust gas discharged from the heat recovery stream generator 20 and releases the filtered gas from the chimney 75 to the atmosphere.

First Embodiment

A first embodiment of the present invention will be described below, using FIGS. 2 to 5.

Figure 2:
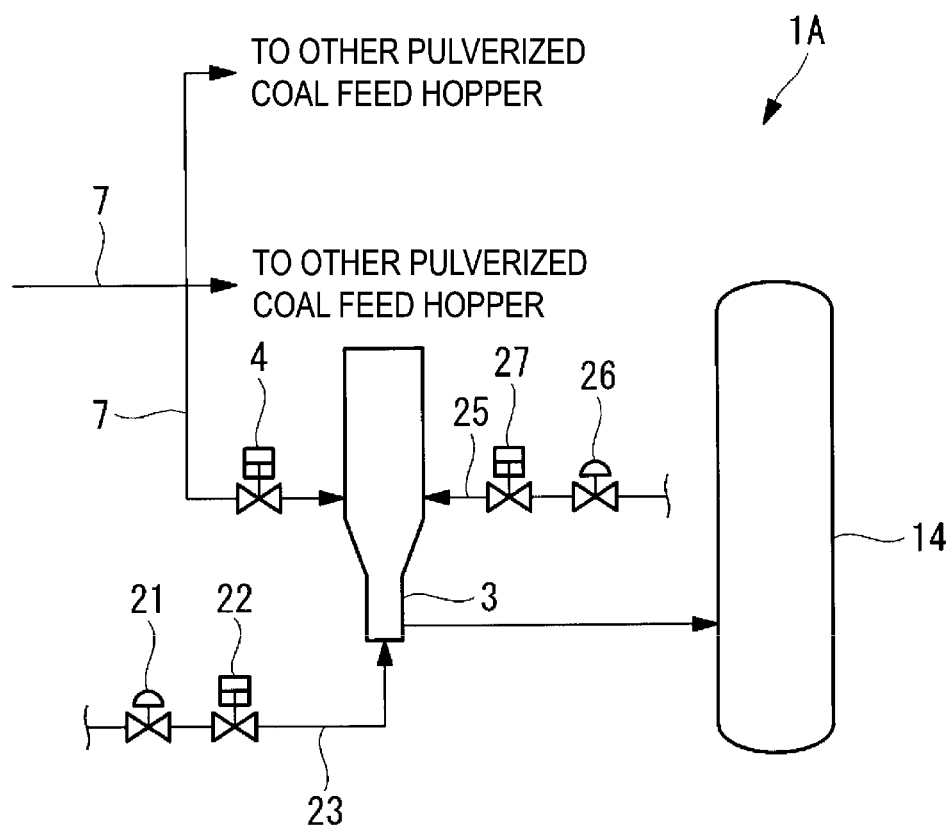
FIG. 2 is a schematic configuration diagram illustrating a pressurizing system including a nozzle with a filter according to an embodiment of the present invention as a pressurizing nozzle.

FIG. 2 illustrates the schematic configuration of a pressurizing system 1A of a pulverized coal feed hopper 3 connected to the downstream side of the coal feeding unit 11 of the above-described integrated coal gasification combined cycle power plant 10.

In the present embodiment, coal is used for the carbonaceous feedstock and pulverized coal is used for the pulverized fuel (powder) and fed to the gasifier unit 14 by the pulverized coal feed hopper. The pulverized coal feed hopper (hereinafter simply referred to as "hopper") 3 temporarily stores the pulverized coal to be fed to the gasifier unit 14 of the integrated coal gasification combined cycle power plant 10.

Multiple (three in the present embodiment) hoppers 3 are disposed in parallel with the gasifier unit 14. In FIG. 2, only one hopper 3 is illustrated, and the other two hoppers are omitted. The gasifier unit 14 receives pulverized coal from the hoppers 3 and gasifies the pulverized coal to generate fuel gas.

Each hopper 3 is connected to a nitrogen gas inlet pipe 7 that feeds pressurized gas such as nitrogen gas to pressurize the inside of the hopper 3. The nitrogen gas inlet pipe 7 connected to the hopper 3 is provided with a hopper inlet valve 4 on the inlet side of the hopper 3. The nitrogen gas feed to the hopper 3 is controlled by opening and closing the hopper inlet valve 4.

Figure 3:
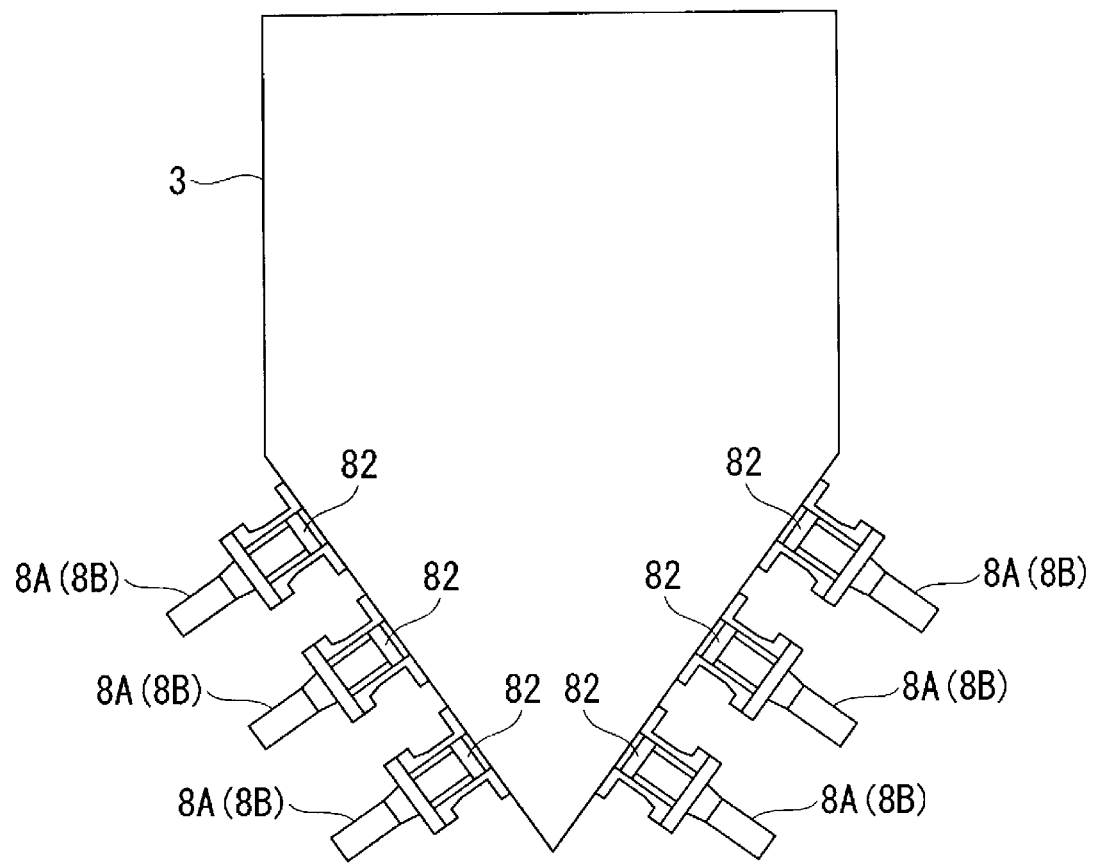
FIG. 3 is a longitudinal cross-sectional view of a hopper of the pressurizing system.

Pressurizing nozzles (nozzles with filter) 8A are provided at the downstream end of the nitrogen gas inlet pipe 7, as illustrated in FIG. 3. A plurality of pressurizing nozzles 8A are disposed on the vertically downward tapered portion of the hopper 3. Each pressurizing nozzle 8A branches from the nitrogen gas inlet pipe 7.

As illustrated in FIG. 2, the hopper 3 is provided with a fluidizing nitrogen pipe 23. Fluidized gas such as nitrogen gas guided from the fluidizing nitrogen pipe 23 fluidizes the pulverized coal in the hopper 3. The fluidizing nitrogen pipe 23 is provided with a flow regulating valve 21 and an on-off valve 22.

The hopper 3 is provided with a nitrogen pipe for adjustment (gas supply system for adjustment) 25. The nitrogen pipe for adjustment 25 is connected to each pressurizing nozzle 8A, illustrated in FIG. 3, and used when the flow state of the pulverized coal in the hopper 3 is adjusted. For example, adjustment gas such as nitrogen gas is fed to avoid failure of continuously feeding pulverized coal due to a bad flow state of the pulverized coal when the pulverized coal is being fed from the hopper 3 to the coal gasifier. Thus, nitrogen gas having a pressure lower than that used for pressurizing the inside of the hopper 3 is supplied. The nitrogen pipe for adjustment 25 is provided with a flow regulating valve 26 and an on-off valve 27.

The nitrogen gas guided from the nitrogen gas inlet pipe 7 connected to a nitrogen gas supply source (not illustrated) is fed to the hopper 3 through the pressurizing nozzles 8A. In this way, nitrogen gas is fed to the hopper 3, and the inside of the hopper 3 is pressurized.

Furthermore, the nitrogen gas guided from the fluidizing nitrogen pipe 23 is fed to a filter (not illustrated) like the pressurizing nozzles 8A.

Figure 4:
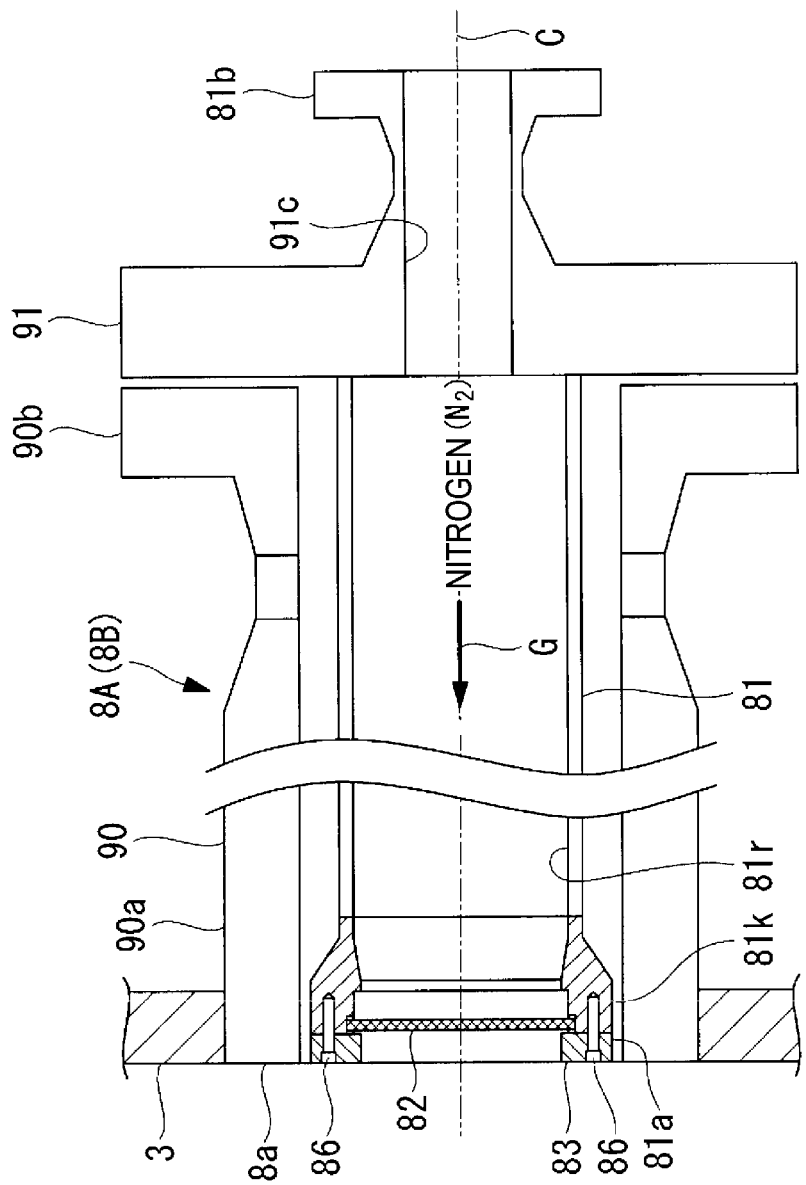
FIG. 4 is a cross-sectional view of the pressurizing nozzle.

As illustrated in FIGS. 3 and 4, for example, filters 82 made of porous sintered metal are provided at the tips of the pressurizing nozzles 8A. The filters 82 face the space in which the powder in the hopper 3 is stored and transmit the nitrogen gas fed from the nitrogen gas inlet pipe 7. Backflow of the pulverized coal in the hopper 3 to the nitrogen gas system is prevented by the filters 82.

Figure 5:
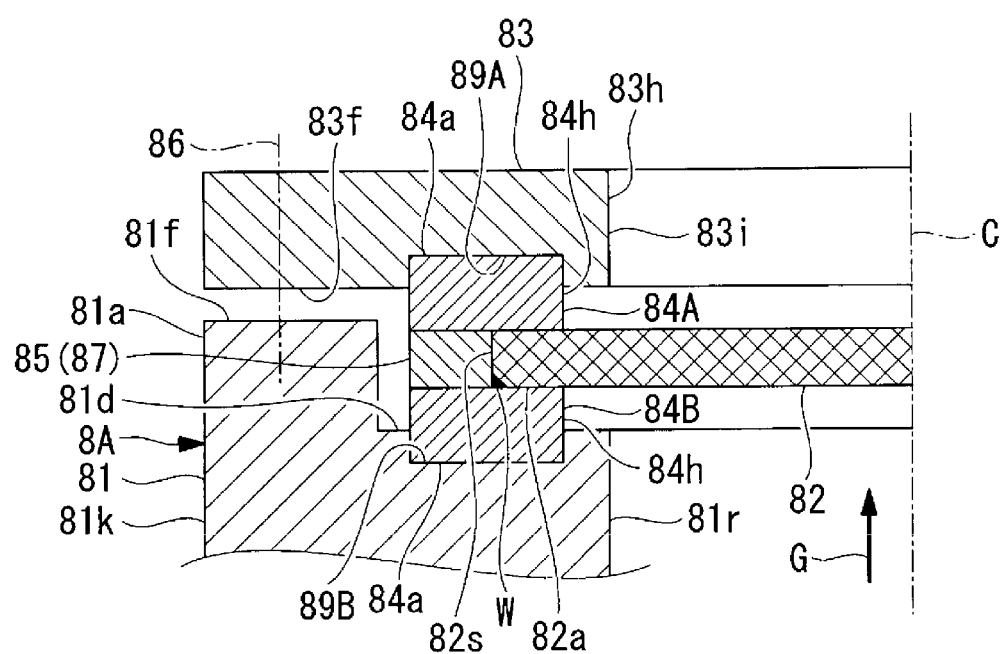
FIG. 5 is an enlarged cross-sectional view of a sealing structure of the outer circumferential portion of the filter of the pressurizing nozzle.

As illustrated in FIG. 5, the pressurizing nozzle 8A includes a nozzle body 81, a filter 82, a retainer 83, a pair of sealing parts 84A and 84B, and a sealing portion 85.

The nozzle body 81 has a cylindrical shape, and nitrogen gas (fluid) G flows inside the nozzle body 81. As illustrated in FIG. 4, the nozzle body 81 is inserted inside a support pipe 90 that penetrates from the inside to outside of the hopper 3 and joined with the hopper 3 in an air-tight manner. The end portion 8a of the pressurizing nozzle 8A is disposed facing the inner side of the hopper 3. The nozzle body 81 has a large-diameter portion 81k expanding outwards in the radial direction at the leading end portion 81a. The large-diameter portion 81k approaches the inner circumferential face of the leading end portion 90a of the support pipe 90 facing the inner side of the hopper 3.

A base end flange 90b joined to the base end portion of the support pipe 90 protruding to the outer side of the hopper 3 is adhered in an air-tight manner in plane contact with a flange member 91 with fastening bolts and nuts (not illustrated) provided around the periphery. The flange member 91 closes an opening on the base end portion 90b side of the support pipe 90 and has an insertion hole 91c in the central portion through which the nozzle body 81 is inserted, to join the nozzle body 81. The nozzle body 81 passes through the insertion hole 91c in the flange member 91 and protrudes from the support pipe 90 on the outer side of the hopper 3. The base end portion 81b of the nozzle body 81 is provided with a joining flange.

In this way, a cylindrical inlet channel that extends from the base end portion 81b of the nozzle body 81 to the inner side of the hopper 3 can be formed in an airtight manner. The nozzle body 81 is connected to the nitrogen gas inlet pipe 7 illustrated in FIG. 2, which allows the nitrogen gas G to flow inside the nozzle body 81.

As illustrated in FIG. 5, the filter 82 covers the cross-section of an inner channel 81r in the nozzle body 81 at the leading end portion 81a of the nozzle body 81 and is disposed substantially orthogonal to the central axis C direction of the nozzle body 81. The filter 82 has a disk shape having an outer diameter larger than the inner diameter of the inner channel 81r and has a predetermined thickness in the central axis C direction of the nozzle body 81. In the present embodiment, the filter 82 has a thickness of, for example, 5 to 20 mm in the central axis C direction, to reduce pressure loss while maintaining strength.

The filter 82 is formed of a porous body made of sintered metal such as stainless steel (SUS). The rate of hole area of the sintered metal of the filter 82 is set such that the nitrogen gas G has an appropriate predetermined flow rate or less to prevent damage such as breakage of the filter 82 due to the nitrogen gas G flowing through the inner channel 81r.

The retainer 83 has an annular shape and an opening portion 83h in its central portion having a diameter the same as that of the inner diameter of the inner channel 81r. The retainer 83 has a facing surface 83f facing the leading end portion 81a of the nozzle body 81 disposed in plane contact with the end face 81f of the large-diameter portion 81k formed at the leading end portion 81a of the nozzle body 81. The retainer 83 has a plurality of through-holes along the circumferential direction such that the retainer 83 is fastened to the end face 81f of the nozzle body 81 with a bolt 86 and a plurality of female thread portion corresponding to the through-holes along the circumferential direction of the facing surface 83f facing the end face 81f. By being fastened with a plurality of bolts 86, the retainer 83 is detachable from the leading end portion 81a of the nozzle body 81.

The retainer 83 sandwiches and fixes the outer circumferential portion 82a of the filter 82, a ring member 87 described below as the sealing portion 85, and the pair of sealing parts 84A and 84B with the leading end portion 81a of the nozzle body 81.

The sealing portion 85 includes the annular ring member 87. The ring member 87 has a thickness larger than or equal to that of the filter 82 in the central axis C direction, specifically, a thickness equal to or slightly larger than that of the filter 82. Thus, deformation of the filter 82 can be reduced when the filter 82 is sandwiched between and adhered with the pair of sealing parts 84A and 84B. Furthermore, the ring member 87 has an inner diameter slightly larger than the outer diameter of the filter 82 and is disposed along the outer circumferential end face 82a of the filter 82. The ring member 87 is made of, for example, stainless steel (SUS), like the filter 82. Since the ring member 87 is made of a solid material, not sintered metal, the ring member 87 itself does not have gas permeability.

The sealing portion 85 including the ring member 87 is disposed around outwards in the radial direction the filter 82. By using the pair of sealing parts 84A and 84B, nitrogen gas G is sealed off and prevented from flowing from the outer circumferential end face 82s outwards in the radial direction through the filter 82.

The ring member 87 is welded along the outer circumferential end face 82s of the filter 82 along the circumferential direction. Here, it is desirable to perform welding of the ring member 87 and the outer circumferential end face 82s of the filter 82 on only a surface either on the nozzle body 81 side or the retainer 83 side. This is because by welding only one surface, the heat input by welding the filter 82 made of sintered metal can be reduced to reduce deformation and damage.

Furthermore, the filter 82 has an outer diameter larger than the inner diameter of the opening portion 83h of the retainer 83. In the present embodiment, the inner diameter is set 2 to 10 mm larger. Thus, the outer circumferential portion 82a of the filter 82 is disposed more outwards in the radial direction than the inner circumferential end face 83i of the opening portion 83h of the retainer 83. In this way, the welded portion W between the outer circumferential portion 82a of the filter 82 and the ring member 87 is disposed more outwards in the radial direction than the inner circumferential end face 83i of the retainer 83.

The welded portion W serves as a fixed end of bending stress generated between the retainer 83 and the filter 82 when pressure is applied to the filter 82 surface, and stress is generated. When the welded portion W serving as the fixed end matches the inner circumferential end face 83i of the retainer 83, the welded portion W is also subjected to a shear force, which may cause a large amount of stress leading to breakage. On the other hand, the welded portion W can be disposed more outwards in the radial direction than the inner circumferential end face 83i of the retainer 83 on a portion facing the base material of the retainer 83, to reduce the shear force applied to the welded portion W and the bending stress so as to increase durability.

Among the pair of sealing parts 84A and 84B, the sealing part 84A is disposed between the retainer 83 and the outer circumferential portion 82a of the filter 82, and between the retainer 83 and the ring member 87 disposed on its outer circumferential side. The sealing part 84B is disposed between a step-like portion 81d of the nozzle body 81 and the outer circumferential portion 82a of the filter 82, and between the step-like portion 81d and the ring member 87 disposed on its outer circumferential side.

The sealing parts 84A and 84B each have an annular shape and an opening 84h in the central portion having a diameter larger than that of the inner diameter of the inner channel 81r. The sealing parts 84A and 84B have an outer diameter the same as that of the outer diameter of the ring member 87. In this way, the ring member 87 is disposed between the outer circumferential end portions 84a and 84a of the pair of sealing parts 84A and 84B.

In the present embodiment, the sealing parts 84A and 84B are disposed on the pressurizing nozzle 8A of the hopper 3. Since the internal environment of the hopper 3 has a normal temperature, the sealing parts 84A and 84B can be formed of rubber-based material or resin-based material having an elastic force.

The outer circumferential portion 82a of the filter 82, the ring member 87 as the sealing portion 85, and the pair of sealing parts 84A and 84B are accommodated in the step-like portion 81d formed on the inner circumference side of the leading end portion 81a of the nozzle body 81. The step-like portion 81d depresses farther away from the retainer 83 than the end face 81f of the nozzle body 81. In this way, the nozzle body 81 maintains the pressure welded state of the pair of sealing parts 84A and 84B with the step-like portion 81d and is in plane contact with the retainer 83 outwards in the radial direction relative to the step-like portion 81d.

Grooves 89A and 89B are continuously formed in the facing surface 83f of the retainer 83 and the leading end portion 81a of the nozzle body 81 along the circumferential direction. Portion of the sealing parts 84A and 84B are fit in the grooves 89A and 89B in the thickness direction, to hold the positions of the sealing parts 84A and 84B. By forming at least one of the grooves 89A and 89B, at least one of the sealing parts can be readily positioned during assembly of the sealing parts. Furthermore, it is desirable to form both of the grooves 89A and 89B.

Here, portions of the retainer 83 and the nozzle body 81 adhered with the sealing parts 84A and 84B, that is, the inner circumferential faces of the grooves 89A and 89B, are smooth to a degree that is readily achievable by machining. For example, it is desirable that they have average coarseness Ra of less than 25 micrometers. In this way, in the retainer 83 and the nozzle body 81, the inner circumferential faces of the grooves 89A and 89B, which are contact faces in contact with the sealing parts 84A and 84B, are smooth and achieve increased adhesiveness with the sealing parts 84A and 84B.

In the above-described pressurizing nozzle 8A, nitrogen gas G is fed from the nitrogen gas inlet pipe 7 illustrated in FIG. 2 to the inner channel 81r of the nozzle body 81. The fed nitrogen gas G flows through the filter 82 into the interior of the hopper 3, to pressurize the inside of the hopper 3. Furthermore, the filter 82 reduces backflow of the pulverized coal in the hopper 3 into the nozzle body 81.

When maintaining the filter 82 of the pressurizing nozzle 8A, the maintenance operation is started with the interior of the hopper 3. The bolt 86 fixing the retainer 83 is loosened from the interior of the hopper 3, and the retainer 83 is disassembled from the leading end portion 81a of the nozzle body 81.

Subsequently, the filter 82, the ring member 87 (sealing portion 85), and the pair of sealing parts 84A and 84B are disassembled from the leading end portion 81a of the nozzle body 81.

The disassembled filter 82 is checked and cleaned or replaced as required.

When installing the filter 82 to the pressurizing nozzle 8A after maintenance, follow the above-described procedure for disassembling the filter 82 in reverse.

In other words, the filter 82, the ring member 87 (sealing portion 85), and the pair of sealing parts 84A and 84B are placed on the step-like portion 81d of the leading end portion 81a of the nozzle body 81.

Subsequently, the retainer 83 is place on the leading end portion 81a of the nozzle body 81 with the bolts 86 and fixed by fastening the bolts 86.

In this way, by performing the maintenance operation of the filter 82 from the interior of the hopper 3, the base end flange 90b and the flange member 91 of the pressurizing nozzle 8A do not need to be disassembled, and thus, leak does not need to be checked in the adhered portion between the base end flange 90b and the flange member 91. Thus, the operation time can be reduced.

With the pressurizing nozzle 8A, the integrated coal gasification combined cycle power plant 10, and the method for disassembling the filter 82 of the pressurizing nozzle 8A, as described above, the sealing portion 85 seal off the nitrogen gas G from flowing outwards in the radial direction from the outer circumferential end face 82s of the filter 82 through the filter 82. Thus, the pulverized coal is prevented from being caught in the flow of gas and causing wear of components of the filter 82. Furthermore, the pair of sealing parts 84A and 84B and the sealing portion 85 surround the outer circumferential portion 82a of the filter 82 in a cross-sectional U-shape. Thus, the nitrogen gas G can be more securely sealed and prevented from flowing outwards in the radial direction. In this way, solid bodies such as char and pulverized coal can be prevented from being caught in the flow of ejected gas flowing outwards in the radial direction of the filter 82 and causing wear and damage due to friction with the components around the filter 82.

Furthermore, the filter 82 can be readily disassembled from the leading end portion 81a of the nozzle body 81 by disassembling the retainer 83 provided on the leading end portion 81a of the nozzle body 81. In other words, since the nitrogen gas inlet pipe 7 connected to the base end portion 81b of the nozzle body 81 for feeding the nitrogen gas G to the interior of the nozzle body 81 does not have to be disassembled from the base end portion 81b of the nozzle body 81, and the base end flange 90b of the pressurizing nozzle 8A and the flange member 91 do not have to be detached, leakage does not have to be checked at the adhered portion between the base end flange 90b and the flange member 91, thereby the filter 82 can be detached on the leading end portion 81a side of the nozzle body 81, that is, inside the hopper 3. Thus, maintenance of the filter 82 can be readily performed, and the operation time can be reduced.

Thus, leakage of gas toward the outer radial direction side of the filter 82 can be assuredly prevented and maintenance of the filter 82 can be readily performed.

Furthermore, since the sealing portion 85 is, for example, a metal ring member 87 having a thickness in the central axis C direction that is slightly larger than or equal to the thickness of the filter 82, the adhesiveness between the pair of sealing parts 84A and 84B can be increased, and the nitrogen gas G can be assuredly sealed off and prevented from flowing out from the outer circumferential end face 82s of the filter 82 outwards in the radial direction through the filter 82.

Furthermore, since the ring member 87, for example, has a thickness in the central axis C direction of the nozzle body 81 slightly larger than or equal to the thickness of the filter 82, at least the outer circumferential portions of the pair of sealing parts 84A and 84B are sandwiched between the leading end portion 81a of the nozzle body 81 and the ring member 87 disposed outwards in the radial direction of the outer circumferential portion 82a of the filter 82 and between the retainer 83 and the ring member 87 disposed outwards in the radial direction of the outer circumferential portion 82a of the filter 82. In this way, since at least the outer circumferential portion of the contact face of the sealing part 84A on the filter 82 side is formed by the ring member 87, the contact face can be gas-tight and smooth in comparison to when the contact face is formed of only the filter 82 made of porous sintered metal. Thus, the sealing properties of the sealing parts 84 are assuredly established.

Furthermore, by welding the ring member 87 along the outer circumferential end face 82s of the filter 82, the filter 82 and the ring member 87 can be attached and detached integrally when attaching or detaching the filter 82. Thus, operability is enhanced. Furthermore, the ring member 87 can be prevented from being displaced relative to the filter 82.

Furthermore, the welded portion W between the outer circumferential end face 82s of the filter 82 and the ring member 87 is disposed more outwards in the radial direction than the inner circumferential end face 83i of the retainer 83. When pressure is applied to the filter 82 surface due to the temperature or pressure of the nitrogen gas G passing through the interior of the nozzle body 81 and the filter 82 deforms, the fixed end of the deformation is the portion disposed between the retainer 83 and the nozzle body 81 and the free end of the deformation is the central side of the nozzle body 81. Thus, the welded portion W between the outer circumferential end face 82s of the filter 82 and the ring member 87 serves a fixed end of bending stress generated between the retainer 83 and the filter 82 when pressure is applied to the filter 82 surface, and stress is generated. When the welded portion W serving as the fixed end matches the inner circumferential end face 83i of the retainer 83, the welded portion W is also subjected to a shear force, which may cause a large amount of stress leading to breakage. As in the present embodiment, since the welded portion W between the outer circumferential end face 82s of the filter 82 and the ring member 87 is disposed more outwards in the radial direction than the portion sandwiched between the inner circumferential end face 83i of the retainer 83 and the nozzle body 81, the generation of a shear force on the welded portion W can be reduced, and the effect of stress due to deformation of the filter 82 on the welded portion W can be reduced. Thus, by reducing the stress applied to the filter 82, separation and/or damage to the welded portion W can be reduced, and durability can be enhanced.

Furthermore, the grooves 89A and 89B in which the sealing parts 84 are fit are formed on the leading end portion 81a of the nozzle body 81 and the retainer 83. In this way, during assembly of the sealing parts 84, the sealing parts 84 can be readily positioned and retained in place to prevent displacement. This enhances operability, and the sealing capability is assuredly established. By forming at least one of the grooves 89A and 89B, at least one of the sealing parts 84 can be readily positioned during assembly of the sealing parts 84. It is more desirable to form both the grooves 89A and 89B because the sealing parts 84 can be readily positioned.

Furthermore, by fitting the sealing parts 84 in the grooves 89A and 89B, the boundary surfaces between the leading end portion 81a of the nozzle body 81 and the sealing parts 84, and between the retainer 83 and the sealing parts 84 form a labyrinth-like structure, whereby the sealing capability can be maintained even when the adhesiveness with the sealing parts 84A and 84B is reduced.

Note that the above-described embodiments describe an example in which the nozzle with a filter according to the present invention is applied to the pressurizing nozzle 8A installed on the pulverized coal feed hopper 3, but this example is not limiting. The nozzle with a filter according to the present invention can be applied to, for example, the feed hopper 52 installed in the char collecting unit 15 and the nozzles in various components installed in bins disposed between the dust collecting unit 51 and the feed hopper 52. In the environment of such a configuration, char having a higher temperature than the pulverized coal is handled. Thus, it is desirable to form the sealing parts 84A and 84B, with a material having low stress relaxation such as expanded graphite.

Second Embodiment

Next, a nozzle with a filter and a gasification combined cycle power generator according to a second embodiment of the present invention will be described. Note that in description below, the components common to the first embodiment including the overall configuration of the integrated coal gasification combined cycle power plant 10 and are given the same reference signs, and explanations thereof are omitted.

Figure 6:
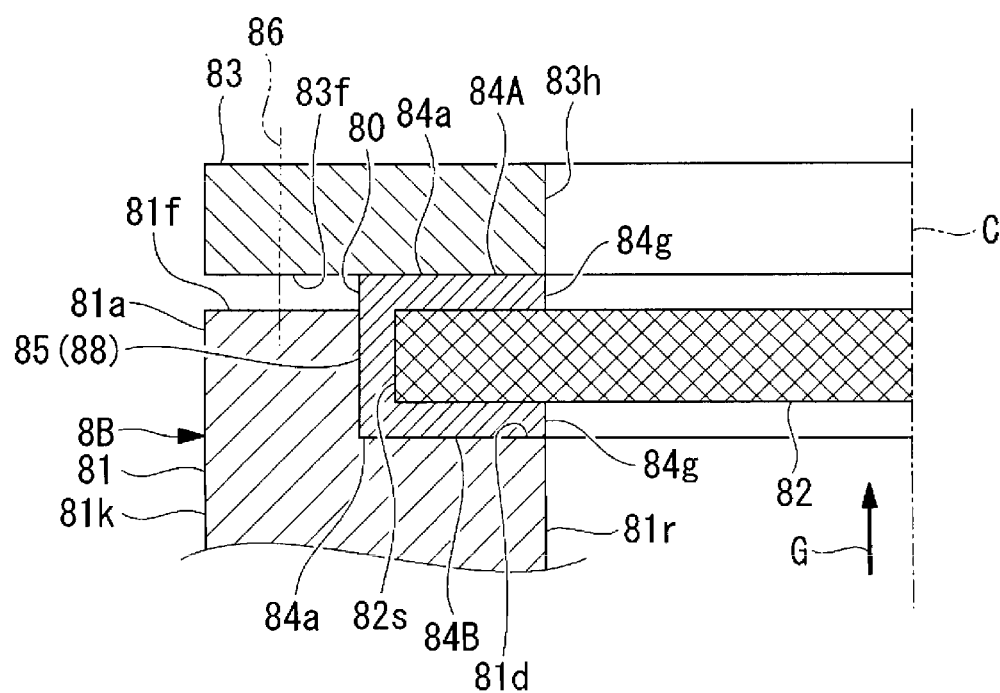
FIG. 6 is an enlarged cross-sectional view of a sealing structure of the outer circumferential portion of the filter of the pressurizing nozzle according to a modification.
Figure 7:
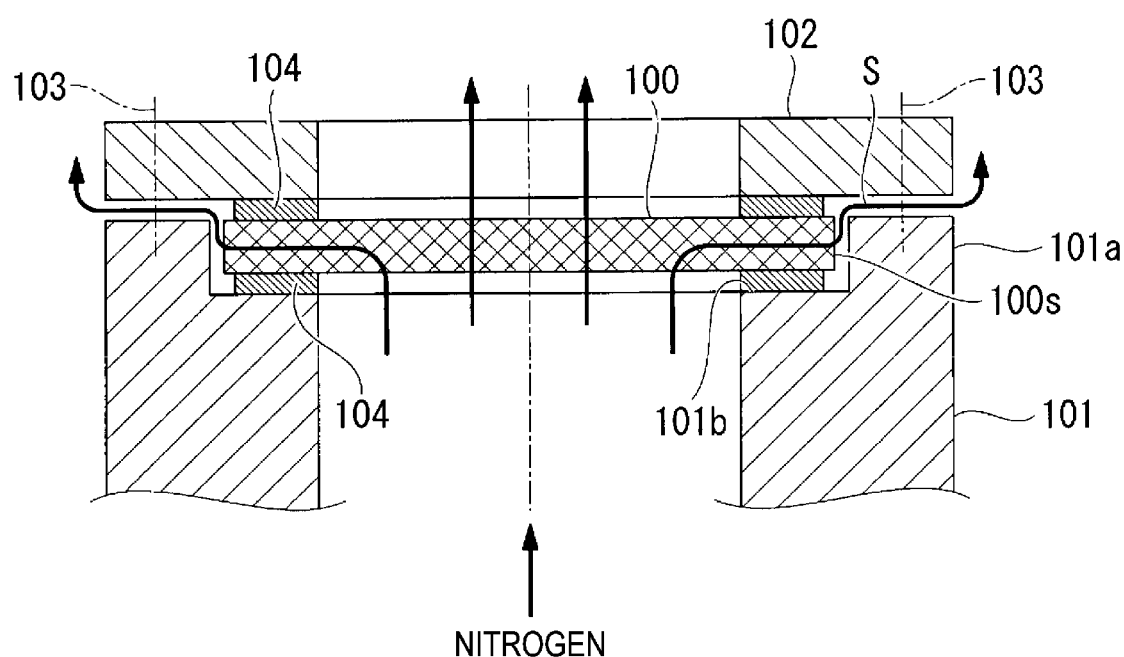
FIG. 7 is an enlarged cross-sectional view of an example structure of the outer circumferential portion of a known nozzle with a filter.
Figure 8:
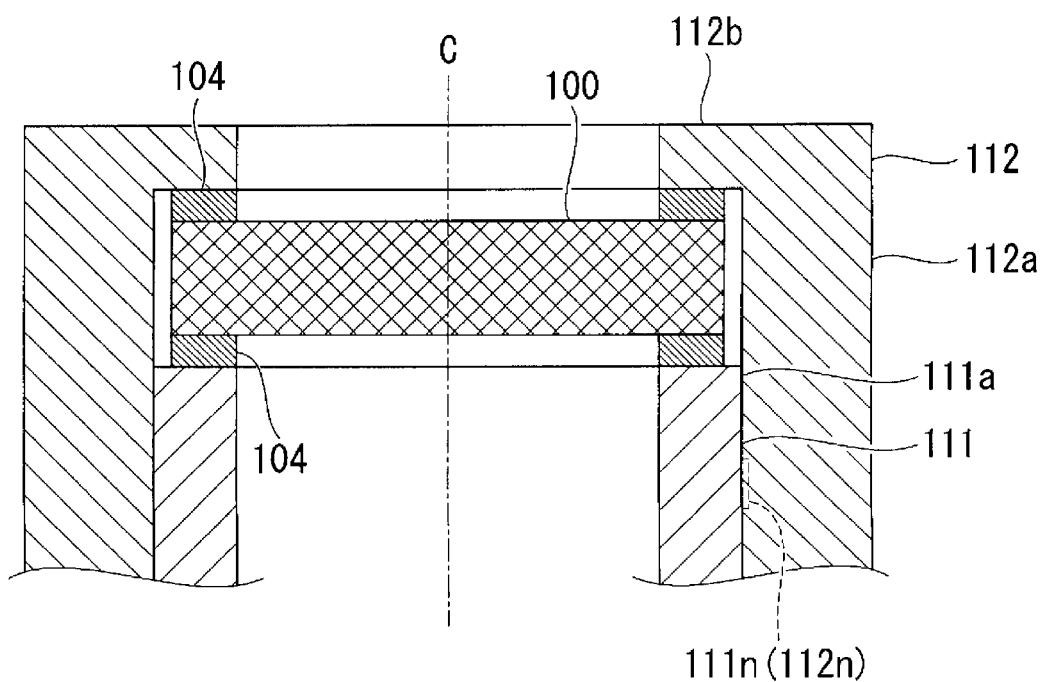
FIG. 8 is an enlarged cross-sectional view of another example structure of the outer circumferential portion of a known nozzle with a filter.

As illustrated in FIG. 6, a pressurizing nozzle (nozzle with a filter) 8B includes a cylindrical nozzle body 81 through which gas such as nitrogen gas flows, a filter 82 disposed substantially orthogonal with the central axis C direction of the nozzle body 81 at the leading end portion 81a of the nozzle body 81 in such a manner to cover the cross-section of the inner channel 81r of the nozzle body 81, a retainer 83 detachable from the leading end portion 81a of the nozzle body 81 by being fastened to the end face 81f of the nozzle body 81 with the bolts 86, and a sealing ring 80.

The outer circumferential sealing portion 88 of the sealing portion 85 and the sealing ring 80 according to the present embodiment differ from the ring member 87 of the sealing portion 85 according to the first embodiment. The sealing ring 80 integrates the pair of sealing parts 84A and 84B and the outer circumferential sealing portion 88 that forms the sealing ring 85. The sealing ring 80 is provided on the pressurizing nozzle 8B installed in the hopper 3, as in the first embodiment. Since the internal environment of the hopper 3 is a normal temperature, the sealing ring 80 can be formed of rubber-based material or resin-based material.

The sealing parts 84A and 84B have annular shapes and openings 84g in the central portions having a diameter that is the same as that of the inner diameter of the inner channel 81r. The sealing parts 84A and 84B have an outer diameter the same as that of the outer diameter of the outer circumferential sealing portion 88.

The sealing portion 85 includes the outer circumferential sealing portion 88 that is made of the same material as the pair of sealing parts 84A and 84B and integrated with the pair of sealing parts 84A and 84B. The outer circumferential sealing portion 88 is disposed between the outer circumferential end portions 84a of the pair of sealing parts 84A and 84B. The outer circumferential sealing portion 88 has a thickness of the inner face side that is the same as that of the filter 82 in the central axis C direction, has an inner diameter that is slightly larger than the outer diameter of the filter 82, and is disposed along the outer circumferential end face 82s of the filter 82. The inner diameter of the pair of sealing parts 84A and 84B is slightly larger than or equal to that of the opening portion 83h of the retainer 83 such that the flow of nitrogen gas G through the inner channel 81r of the nozzle body 81 is not blocked at the filter 82 surface by the sealing parts 84A and 84B.

The sealing portion 85 including the outer circumferential sealing portion 88 is disposed around outwards in the radial direction of the filter 82 such that the nitrogen gas G is sealed off and prevented from flowing from the outer circumferential end face 82s outwards in the radial direction through the filter 82.

In the above-described pressurizing nozzle 8B and the integrated coal gasification combined cycle power plant 10, the pair of sealing parts 84A and 84B and the sealing ring 80 including the outer circumferential sealing portion 88 (sealing portion 85) surround the outer circumferential portion 82a of the filter 82 in a cross-sectional U-shape. Thus, the nitrogen gas G can be assuredly sealed and prevented from flowing outwards in the radial direction of the filter 82. In this way, solid bodies such as char can be prevented from being caught in the flow of ejected gas flowing outwards in the radial direction of the filter 82 and causing wear and damage due to friction between the solid bodies and the components around the filter 82.

Furthermore, the filter 82 can be readily disassembled from the leading end portion 81a of the nozzle body 81 by disassembling the retainer 83 provided on the leading end portion 81a of the nozzle body 81. In other words, since the nitrogen gas inlet pipe 7 connected to the base end portion 81b of the nozzle body 81 for feeding the nitrogen gas G to the interior of the nozzle body 81 does not have to be disassembled from the base end portion 81b of the nozzle body 81, and the base end flange 90b and the flange member 91 of the pressurizing nozzle 8A do not have to be detached, leakage does not have to be checked at the adhered portion between the base end flange 90b and the flange member 91. In this way, the filter 82 can be detached on the leading end portion 81a side of the nozzle body 81, that is, inside the hopper 3. Thus, maintenance of the filter 82 can be readily performed, and the operation time can be reduced.

Thus, leakage of gas toward the outer radial direction side of the filter 82 can be assuredly prevented and maintenance of the filter 82 can be readily performed.

Furthermore, since the pair of sealing parts 84A and 84B and the sealing portion 85 are integrated into a single unit, both the pair of sealing parts 84A and 84B and the sealing portion 85 can be disassembled as a single unit together with the filter 82 by disassembling the retainer 83 installed on the leading end portion 81a of the nozzle body 81. Furthermore, the step-like portion 81d is depressed in a direction away from the retainer 83 and can prevent the sealing portion 85 from being displaced relative to the filter 82.

Furthermore, since the sealing ring 80 integrates the pair of sealing parts 84A and 84B and the outer circumferential sealing portion 88 (sealing portion 85), the welded portion W used for the joining of the ring member 87 of the sealing portion 85 and the outer circumferential end face 82s of the filter 82 in the first embodiment is not needed.

Since the filter 82 is supported by the pair of sealing parts 84A and 84B having an elastic force, the bending stress generated while pressure is applied to the filter 82 with the fixed end positioned between the retainer 83 and the filter 82 is small. The shear force generated on the end faces 84g of the sealing parts 84A and 84B is small even when the end faces 84g of the sealing parts 84A and 84B are flush with the inner circumferential end face 83i of the retainer 83. Thus, large stress that may cause damage is not generated.

Note that in the above-described embodiment, the IGCC including a coal gasifier generating combustible gas from pulverized coal is described as an example. However, the gasifier unit according to the present invention may be applied to any gasifier that gasifies other carbonaceous feedstock such as biomass fuel, including thinned wood, waste wood, driftwood, grass, waste, sludge, and tires. Furthermore, the gasifier unit according to the present invention may be applied to a gasifier for a chemical plant that obtains desired chemical material, besides a gasifier for electricity generation.

Furthermore, in the embodiments described above, coal is used as fuel. Alternatively, the fuel may be high rank coal and low rank coal. Alternatively, the fuel may be biomass used as biological organic material that is recyclable, such as thinned wood, waste wood, driftwood, grass, waste, sludge, tires, and recycled fuel (palettes and chips) made of these raw materials.

REFERENCE SIGNS LIST

1A Pressurizing system
3 Pulverized coal feed hopper (hopper)
8A, 8B Pressurizing nozzle (nozzle with a filter)
10 Integrated coal gasification combined cycle (IGCC) power plant (gasification combined cycle power generator)
11 Coal feeding unit
11a Coal line
14 Gasifier unit
15 Char collecting unit
16 Gas purifying unit
17 Gas turbine
18 Steam turbine
19 Generator
20 Heat recovery stream generator
41 Compressed-air feed line
42 Air separating unit
43 First nitrogen feed line
45 Second nitrogen feed line
46 Char return line
47 Oxygen feed line
48 Foreign-material removing unit
49 Gas generation line
51 Dust collecting unit
52 Feed hopper
53 Gas discharge line
61 Compressor
62 Combustor
63 Turbine
64 Rotating shaft
65 Compressed-air feed line
66 Fuel-gas feed line
67 Combustion-gas feed line
68 Booster
69 Turbine
70 Gas discharge line
71 Steam feed line
72 Steam collecting line
74 Gas emission filtering unit 75 Chimney
80 Sealing ring
81 Nozzle body
81a Leading end portion
81b Base end portion
81r Inner channel
82 Filter
82a Outer circumferential portion
82s Outer circumferential end face
83 Retainer
83f Facing surface
83i Inner circumferential end face
84A, 84B Sealing part
84a Outer circumferential end portion
85 Sealing portion
87 Ring member
88 Outer circumferential sealing portion
89A, 89B Groove
C Central axis
G Nitrogen gas (fluid)
W Welded portion

The invention claimed is:

1. A nozzle with a filter, comprising:
a nozzle body having a cylindrical shape, the nozzle body in which a fluid flows;
a filter including a porous body, the filter having a predetermined thickness in a central axis direction, the filter disposed in such a manner to cover an inner cross-sectional face of the nozzle body at an inside of a leading end portion on a first end portion side of the nozzle body, the inside being in a radial direction of the nozzle body;
a retainer having an annular shape, the retainer attached via bolts to the leading end portion of the nozzle body in a detachable manner, the retainer configured to fix an outer circumferential portion of the filter via a pair of sealing parts; and
a sealing portion disposed along an outer circumferential end face of the filter, the sealing portion configured to seal off and prevent the fluid from flowing out from the outer circumferential end face outwards in a radial direction through the filter,
wherein a flange member is disposed on a base end portion of the nozzle body on a second end portion side, the flange member configured to be in a plane contact with the base end portion of the nozzle body such that the flange member and the base end portion are made airtight.

2. The nozzle with a filter according to claim 1, wherein
the retainer having an annular shape is attached to the leading end portion of the nozzle body in a detachable manner, the retainer is configured to fix the outer circumferential portion of the filter by sandwiching between the retainer and the leading end portion of the nozzle body;
the pair of sealing parts include a first sealing part disposed between the leading end portion of the nozzle body and the outer circumferential portion of the filter, and a second sealing part between the retainer and the outer circumferential portion of the filter; and
the sealing portion is disposed between outer circumferential end portions of the pair of sealing parts along the outer circumferential end face of the filter.

3. The nozzle with a filter according to claim 1, wherein the sealing portion is a ring member made of metal, the ring member having a thickness in the central axis direction equal to or larger than the thickness of the filter.

4. The nozzle with a filter according to claim 3, wherein the filter includes sintered metal; and
a welded portion is provided to fix the ring member and one of end portions of the filter in the central axis direction of the outer circumferential end face.

5. The nozzle with a filter according to claim 3, wherein a welded portion connecting the filter and the ring member is disposed more outwards in a radial direction of the retainer than an inner circumferential end face of the retainer.

6. The nozzle with a filter according to claim 1, wherein the sealing portion is made of the same material as the pair of sealing parts, the sealing portion being integrated with the pair of sealing parts in a U-shape cross-section.

7. The nozzle with a filter according to claim 1, wherein a groove is formed on at least one of the leading end portion of the nozzle body and the retainer, the groove configured to fit with only one of the pair of sealing parts.

8. A gasification combined cycle power generator, comprising the nozzle with the filter according to claim 1.

* * * * *